United States Patent
Müller et al.

(10) Patent No.: US 9,676,905 B2
(45) Date of Patent: *Jun. 13, 2017

(54) POLYETHER CARBONATE POLYOL PRODUCTION METHOD

(71) Applicant: Covestro Deutschland AG, Leverkusen (DE)

(72) Inventors: Thomas Ernst Müller, Aachen (DE); Christoph Gürtler, Köln (DE); Jörg Hofmann, Krefeld (DE); Matthias Wohak, Dormagen (DE); Stefanie Braun, Köln (DE); Aurel Wolf, Wülfrath (DE); Ilja Peckermann, Köln (DE)

(73) Assignee: Covestro Deutschland AG, Leverkusen (DE)

( * ) Notice: Subject to any disclaimer, the term of this patent is extended or adjusted under 35 U.S.C. 154(b) by 155 days.

This patent is subject to a terminal disclaimer.

(21) Appl. No.: 14/423,856

(22) PCT Filed: Aug. 23, 2013

(86) PCT No.: PCT/EP2013/067580
§ 371 (c)(1),
(2) Date: Feb. 25, 2015

(87) PCT Pub. No.: WO2014/033071
PCT Pub. Date: Mar. 6, 2014

(65) Prior Publication Data
US 2015/0259475 A1    Sep. 17, 2015

(30) Foreign Application Priority Data
Aug. 27, 2012  (EP) .................................... 12181907

(51) Int. Cl.
*C08G 65/26* (2006.01)
*C08G 64/34* (2006.01)

(52) U.S. Cl.
CPC ......... *C08G 65/2603* (2013.01); *C08G 64/34* (2013.01); *C08G 65/2663* (2013.01); *C08G 65/2696* (2013.01)

(58) Field of Classification Search
None
See application file for complete search history.

(56) References Cited

U.S. PATENT DOCUMENTS

| | | |
|---|---|---|
| 3,404,109 A | 10/1968 | Milgrom |
| 3,829,505 A | 8/1974 | Herold |
| 3,941,849 A | 3/1976 | Herold |
| 5,158,922 A | 10/1992 | Hinney et al. |
| 5,470,813 A | 11/1995 | Le-Khac |
| 6,767,986 B2 | 7/2004 | Moethrath et al. |
| 6,780,813 B1 | 8/2004 | Hofmann et al. |
| 6,835,687 B2 | 12/2004 | Hofmann et al. |
| 7,008,900 B1 | 3/2006 | Hofmann et al. |
| 8,247,520 B2 | 8/2012 | Allen et al. |
| 8,324,419 B2 | 12/2012 | Mijolovic et al. |
| 8,933,192 B2 | 1/2015 | Gürtler et al. |
| 2013/0211042 A1* | 8/2013 | Gurtler ................. C08G 64/34 528/405 |

FOREIGN PATENT DOCUMENTS

| | | |
|---|---|---|
| EP | 0 222 453 A2 | 5/1987 |
| EP | 0700949 A2 | 3/1996 |
| EP | 0743093 A1 | 11/1996 |
| EP | 0761708 A2 | 3/1997 |
| EP | 1359177 A1 | 11/2003 |
| JP | 4145123 B2 | 9/2008 |
| WO | WO-97/40086 A1 | 10/1997 |
| WO | WO-98/16310 A1 | 4/1998 |
| WO | WO-00/47649 A1 | 8/2000 |
| WO | WO-01/39883 A1 | 6/2001 |
| WO | WO-01/80994 A1 | 11/2001 |
| WO | WO-03/029325 A1 | 4/2003 |
| WO | WO-2008092767 A1 | 8/2008 |
| WO | WO-2011089120 A1 | 7/2011 |

OTHER PUBLICATIONS

International Search Report for PCT/EP2013/067580 mailed Nov. 12, 2013.

* cited by examiner

*Primary Examiner* — Matthew Coughlin
*Assistant Examiner* — Po-Chih Chen
(74) *Attorney, Agent, or Firm* — N. Denise Brown

(57) ABSTRACT

The invention relates to a method for producing polyether carbonate polyols by attaching alkylene oxides and carbon dioxide to one or more H-functional starters in the presence of a double-metal cyanide catalyst, characterized in that (alpha) a suspending agent which contains no H-functional groups is provided in a reactor, (ss) optionally, a moiety of alkylene oxide is added to the mixture from step (alpha) at temperatures of 90 to 150 DEG C., and the addition of the alkylene oxide compound is then interrupted; and (gamma) one or more H-functional starters are continuously metered into the reactor during the reaction.

15 Claims, No Drawings

POLYETHER CARBONATE POLYOL PRODUCTION METHOD

CROSS-REFERENCE TO RELATED APPLICATIONS

This application is a national stage application (under 35 U.S.C. §371) of PCT/EP2013/067580, filed Aug. 23, 2013, which claims benefit of European Application No. 12181907.2, filed Aug. 27, 2012.

The present invention relates to a process for the preparation of polyether carbonate polyols by catalytic copolymerization of carbon dioxide ($CO_2$) with alkylene oxides in the presence of one or more H-functional starter substances.

The preparation of polyether carbonate polyols by catalytic reaction of alkylene oxides (epoxides) and carbon dioxide in the presence of H-functional starter substances ("starters") has been investigated intensively for more than 40 years (e.g. Inoue et al., Copolymerization of Carbon Dioxide and Epoxide with Organometallic Compounds; Die Makromolekulare Chemie 130, 210-220, 1969). This reaction is shown in diagram form in equation (I), wherein R represents an organic radical, such as alkyl, alkylaryl or aryl, each of which can also comprise hetero atoms, such as, for example, O, S, Si etc., and wherein e, f and g represent an integer, and wherein the product shown here for the polyether carbonate polyol in equation (I) is merely to be understood as meaning that blocks with the structure shown can in principle be found in the polyether carbonate polyol obtained, but the sequence, number and length of the blocks and the OH functionality of the starter can vary and is not limited to the polyether carbonate polyol shown in equation (I). This reaction (see equation (I)) is ecologically very advantageous, since this reaction represents the conversion of a greenhouse gas, such as $CO_2$, into a polymer. The cyclic carbonate (for example for $R=CH_3$ propylene carbonate) shown in equation (I) is formed as a further product, actually a by-product.

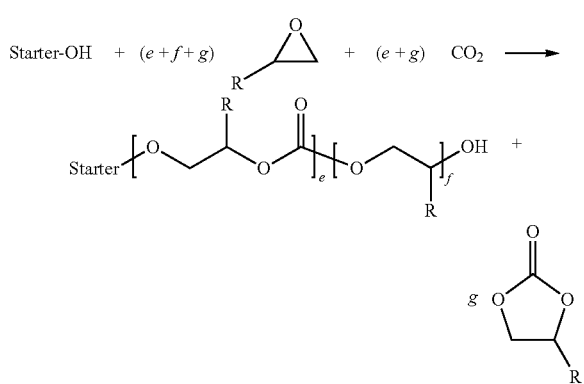

EP-A 0 222 453 discloses a process for the preparation of polycarbonates from alkylene oxides and carbon dioxide using a catalyst system of DMC catalyst and a co-catalyst, such as zinc sulfate. In this process, the polymerization is initiated by bringing a part of the alkylene oxide into contact with the catalyst system once. Only thereafter are the remaining amount of alkylene oxide and the carbon dioxide metered in simultaneously. The amount of 60 wt. % of alkylene oxide compound stated in EP-A 0 222 453 for the activation step in Examples 1 to 7 is high relative to the H-functional starter compound and has the disadvantage that this represents a certain safety risk for large-scale industrial uses because of the high exothermicity of the homopolymerization of alkylene oxide compounds.

WO-A 2003/029325 discloses a process for the preparation of high molecular weight aliphatic polyether carbonate polyols (weight-average molecular weight greater than 30,000 g/mol), in which an anhydrous catalyst from the group consisting of zinc carboxylate and multimetal cyanide compound is employed, which is first brought into contact with at least a part amount of the carbon dioxide, before the alkylene oxide is added. $CO_2$ final pressures of up to 150 bar impose very high requirements on the reactor and on safety. Even by means of the extremely high pressure of 150 bar, only approx. 33 wt. % of $CO_2$ to a maximum of 42 wt. % of $CO_2$ was incorporated. The examples presented describe the use of a solvent (toluene), which must be separated off again by means of heat after the reaction, which leads to an increased time and cost outlay. Furthermore, the polymers, with an inhomogeneity or polydispersity of 2.7 or more, have a very broad molecular weight distribution.

WO-A 2008/092767 discloses a process for the preparation of polyether carbonate polyols, characterized in that one or more H-functional starter substances are initially introduced into the reactor, and in that one or more H-functional starter substances are metered continuously into the reactor during the reaction. This process thus has the disadvantage that one or more H-functional starter substances must be initially introduced into the reactor.

It was therefore the object of the present invention to provide a process for the preparation of polyether carbonate polyols in which no H-functional starter substances have to be initially introduced into the reactor, the process leading to a product which both leads to a high content of incorporated $CO_2$ in the resulting polyether carbonate polyol and wherein at the same time a favourable selectivity (i.e. low ratio of cyclic carbonate to linear polymer-bonded carbonate) is achieved.

It has been found, surprisingly, that the object according to the invention is achieved by a process for the preparation of polyether carbonate polyols from one or more H-functional substance(s), one or more alkylene oxide(s) and carbon dioxide in the presence of a DMC catalyst, characterized in that (α) a suspending agent which comprises no H-functional groups is initially introduced into a reactor, optionally together with DMC catalyst, (β) a part amount of alkylene oxide is optionally added to the mixture from step (α) at temperatures of from 90 to 150° C., and the addition of the alkylene oxide compound then being interrupted, and (γ) one or more H-functional starter substance(s) are metered continuously into the reactor during the reaction.

In the process according to the invention, a suspending agent which comprises no H-functional groups is first initially introduced into the reactor. The amount of DMC catalyst, which is preferably not activated, required for the polyaddition is then introduced into the reactor. The sequence of the addition is not critical in this context. It is also possible for first the DMC catalyst and then the suspending agent to be introduced into the reactor. Alternatively, it is also possible for the DMC catalyst first to be suspended in the inert suspending agent and then for the suspension to be introduced into the reactor. An adequate heat exchange area with the reactor wall or cooling elements installed in the reactor is made available by the suspending agent, so that the heat of reaction liberated can be very readily removed. Furthermore, in the absence of cooling the suspending agent provides a thermal capacity, such that in this case the temperature can be kept below the decomposition temperature of the reaction mixture.

The suspending agents employed according to the invention comprise no H-functional groups. Suitable suspending agents are all polar aprotic, weakly polar aprotic and nonpolar aprotic solvents which in each case comprise no H-functional groups. A mixture of two or more of these suspending agents can also be employed as the suspending agent. The following polar aprotic solvents may be mentioned by way of example at this point: 4-methyl-2-oxo-1,3-dioxolane (hereinafter also called cyclic propylene carbonate or cPC), 1,3-dioxolan-2-one (hereinafter also called cyclic ethylene carbonate or cEC), acetone, methyl ethyl ketone, acetonitrile, nitromethane, dimethylsulfoxide, sulfolane, dimethylformamide, dimethylacetamide and N-methylpyrrolidone. The group of nonpolar and weakly polar aprotic solvents includes e.g. ethers, such as e.g. dioxane, diethyl ether, methyl tert-butyl ether and tetrahydrofuran, esters, such as e.g. ethyl acetate and butyl acetate, hydrocarbons, such as e.g. pentane, n-hexane, benzene and alkylated benzene derivatives (e.g. toluene, xylene, ethylbenzene), and chlorinated hydrocarbons, such as e.g. chloroform, chlorobenzene, dichlorobenzene and carbon tetrachloride. 4-Methyl-2-oxo-1,3-dioxolane, 1,3-dioxolan-2-one, toluene, xylene, ethylbenzene, chlorobenzene and dichlorobenzene and mixtures of two or more of these suspending agents are preferably employed as the suspending agent, and 4-methyl-2-oxo-1,3-dioxolane and 1,3-dioxolan-2-one or a mixture of 4-methyl-2-oxo-1,3-dioxolane and 1,3-dioxolan-2-one are particularly preferred.

Step ($\alpha$):

Preferably, in step ($\alpha$) a suspending agent which comprises no H-functional groups is initially introduced into the reactor, optionally together with DMC catalyst, and no H-functional starter substance is initially introduced into the reactor. Alternatively, in step ($\alpha$) it is also possible for a suspending agent which comprises no H-functional groups and additionally a part amount of the H-functional starter substance(s) and optionally DMC catalyst to be initially introduced into the reactor.

The DMC catalyst is preferably employed in an amount such that the content of DMC catalyst in the resulting reaction product is 10 to 10,000 ppm, particularly preferably 20 to 5,000 ppm and most preferably 50 to 500 ppm.

In a preferred embodiment, inert gas (for example argon or nitrogen), an inert gas/carbon dioxide mixture or carbon dioxide is passed into the resulting mixture of suspending agent and DMC catalyst at a temperature of from 90 to 150° C., particularly preferably from 100 to 140° C., and at the same time a reduced pressure (absolute) of from 10 mbar to 800 mbar, particularly preferably from 50 mbar to 200 mbar, is applied.

In an alternative preferred embodiment, the resulting mixture of suspending agent and DMC catalyst is charged, at a temperature of from 90° C. to 150° C., particularly preferably from 100 to 140° C., at least once, preferably three times, with 1.5 bar to 10 bar (absolute), particularly preferably 3 bar to 6 bar (absolute) of an inert gas (for example argon or nitrogen), an inert gas/carbon dioxide mixture or carbon dioxide and each time the increased pressure is subsequently reduced to approx. 1 bar (absolute).

The DMC catalyst can be added in the solid form or as a suspension in a suspending agent or in a mixture of at least two suspending agents.

In a further preferred embodiment, in step ($\alpha$)

($\alpha$-I) the suspending agent or a mixture of at least two suspending agents is initially introduced and ($\alpha$-II) the temperature of the suspending agent or of the mixture of at least two suspending agents is brought to 50 to 200° C., preferably 80 to 160° C., particularly preferably 100 to 140° C. and/or the pressure in the reactor is lowered to less than 500 mbar, preferably 5 mbar to 100 mbar, an inert gas stream (for example of argon or nitrogen), an inert gas/carbon dioxide stream or a carbon dioxide stream optionally being passed through the reactor, the double metal cyanide catalyst being added to the suspending agent or to the mixture of at least two suspending agents in step ($\alpha$-I) or immediately subsequently in step ($\alpha$-II), and the suspending agent comprising no H-functional groups.

Step ($\beta$):

Step ($\beta$) serves for activation of the DMC catalyst. This step can optionally be carried out under an inert gas atmosphere, under an atmosphere of an inert gas/carbon dioxide mixture or under a carbon dioxide atmosphere. A step in which a part amount of alkylene oxide compound is added to the DMC catalyst suspension at temperatures of from 90 to 150° C. and the addition of the alkylene oxide compound is then interrupted, due to a subsequent exothermic chemical reaction an evolution of heat which can lead to a temperature peak ("hot spot"), and due to the reaction of alkylene oxide and optionally $CO_2$ a drop in pressure in the reactor being observed, is called activation in the context of this invention. The process step of activation is the time span from the addition of the part amount of alkylene oxide compound, optionally in the presence of $CO_2$, to the DMC catalyst up to the occurrence of the evolution of heat. The part amount of alkylene oxide compound can optionally be added to the DMC catalyst in several individual steps, optionally in the presence of $CO_2$, the addition of the alkylene oxide compound then being interrupted each time. In this case the process step of activation includes the time span from the addition of the first part amount of alkylene oxide compound, optionally in the presence of $CO_2$, to the DMC catalyst up to the occurrence of the evolution of heat after addition of the last part amount of alkylene oxide compound. In general, the activation step can be preceded by a step for drying the DMC catalyst and, where appropriate, the H-functional starter compound at elevated temperature and/or under reduced pressure, optionally while passing an inert gas through the reaction mixture The metering of one or more alkylene oxides (and where appropriate of the carbon dioxide) can in principle be carried out in various ways. The start of the metering can take place from a vacuum or under a previously selected prepressure. The prepressure is preferably established by passing in an inert gas (such as, for example, nitrogen or argon) or carbon dioxide, the pressure (absolute) being 5 mbar to 100 bar, preferably 10 mbar to 50 bar and preferably 20 mbar to 50 bar.

In a preferred embodiment, the amount of one or more alkylene oxides employed in the activation in step ($\beta$) is 0.1 to 25.0 wt. %, preferably 1.0 to 20.0 wt. %, particularly preferably 2.0 to 16.0 wt. % (based on the amount of suspending agent employed in step ($\alpha$)). The alkylene oxide can be added in one step or in portions in several part amounts. Preferably, after addition of a part amount of alkylene oxide compound the addition of the alkylene oxide compound is interrupted until the evolution of heat occurs and only then is the next part amount of alkylene oxide compound added. A two-stage activation (step β) is also preferred, wherein (β1) in a first activation stage the addition of a first part amount of alkylene oxide is carried out under an inert gas atmosphere and (β2) in a second activation stage the addition of a second part amount of alkylene oxide is carried out under a carbon dioxide atmosphere.

Step (γ):

The metering of one or more H-functional starter substance(s), of one or more alkylene oxide(s) and where appropriate also of the carbon dioxide can be carried out simultaneously or sequentially (in portions), for example the total amount of carbon dioxide, the amount of H-functional starter substances and/or the amount of alkylene oxides metered in step (γ) can be added all at once or continuously. The term "continuously" used here can be defined as the mode of addition of a reactant such that a concentration of the reactant which is effective for the copolymerization is maintained, i.e. for example the metering can be carried out with a constant metering rate, with a varying metering rate or in portions.

It is possible to increase or to lower, gradually or stepwise, or to leave constant the $CO_2$ pressure during the addition of the alkylene oxide and/or of the H-functional starter substances. Preferably, the overall pressure is kept constant during the reaction by topping up with carbon dioxide. The metering of one or more alkylene oxide(s) and/or of the one or more H-functional starter substance(s) is carried out simultaneously with or sequentially to the carbon dioxide metering. It is possible to meter the alkylene oxide with a constant metering rate or to increase or to lower the metering rate gradually or stepwise or to add the alkylene oxide in portions. Preferably, the alkylene oxide is added to the reaction mixture with a constant metering rate. If several alkylene oxides are employed for the synthesis of the polyether carbonate polyols, the alkylene oxides can be metered in individually or as a mixture. The metering of the alkylene oxides or of the H-functional starter substances can be carried out simultaneously or sequentially via in each case separate meterings (additions), or via one or more meterings, it being possible for the alkylene oxides or the H-functional starter substances to be metered individually or as a mixture. Via the nature and/or the sequence of the metering of the H-functional starter substances, of the alkylene oxides and/or of the carbon dioxide it is possible to synthesize random, alternating, block-like or gradient-like polyether carbonate polyols.

In a preferred embodiment, in step (γ) the metering of the one or more H-functional starter substance(s) is ended at a time before the addition of the alkylene oxide.

Preferably, an excess of carbon dioxide, based on the calculated amount of incorporated carbon dioxide in the polyether carbonate polyol, is employed, since due to the slowness of carbon dioxide to react an excess of carbon dioxide is advantageous. The amount of carbon dioxide can be determined via the overall pressure under the particular reaction conditions. The range of from 0.01 to 120 bar, preferably 0.1 to 110 bar, particularly preferably from 1 to 100 bar has proved to be advantageous as the overall pressure (absolute) for the copolymerization for the preparation of the polyether carbonate polyols. It is possible to feed in the carbon dioxide continuously or discontinuously. This depends on how rapidly the alkylene oxides are consumed, and on whether the product is optionally to contain $CO_2$-free polyether blocks. The amount of carbon dioxide (stated as the pressure) can equally be varied during the addition of the alkylene oxides. $CO_2$ can also be added to the reactor as a solid and can then pass into the gaseous, dissolved, liquid and/or supercritical state under the reaction conditions chosen.

A preferred embodiment of the process according to the invention is characterized in that, inter alia, in step (γ) the total amount of the one or more H-functional starter substance(s) is added. This addition can be carried out with a constant metering rate, with a varying metering rate or in portions.

It has furthermore been found for the process according to the invention that the copolymerization (step (γ)) for the preparation of the polyether carbonate polyols is advantageously carried out at 50 to 150° C., preferably at 60 to 145° C., particularly preferably at 70 to 140° C. and very particularly preferably at 90 to 130° C. If temperatures below 50° C. are established, the reaction in general becomes very slow. At temperatures above 150° C. the amount of undesirable by-products increases greatly.

The metering of the alkylene oxide, of the H-functional starter compound and of the DMC catalyst can be carried out via separate or common metering points. In a preferred embodiment, the alkylene oxide and the H-functional starter compound are fed continuously to the reaction mixture via separate metering points. This addition of the one or more H-functional starter substance(s) can be carried out as continuous metering into the reactor or in portions.

Steps (α), (β) and (γ) can be carried out in the same reactor or in each case separately in different reactors. Particularly preferred reactor types are: tube reactors, stirred tanks, loop reactors.

Polyether carbonate polyols can be prepared in a stirred tank, the stirred tank being cooled via the reactor jacket, internal cooling surfaces and/or cooling surfaces in a pumped circulation, depending on the embodiment and mode of operation. Both in the semi-batch use, in which the product is removed only after the end of the reaction, and in the continuous use, in which the product is removed continuously, attention is to be paid in particular to the metering rate of the alkylene oxide. It is to be adjusted such that in spite of the inhibiting action of the carbon dioxide, the alkylene oxides react sufficiently rapidly. The concentration of free alkylene oxides in the reaction mixture during the activation step (step β) is preferably >0 to 100 wt. %, particularly preferably >0 to 50 wt. %, most preferably >0 to 20 wt. % (in each case based on the weight of the reaction mixture). The concentration of free alkylene oxides in the reaction mixture during the reaction (step γ) is preferably >0 to 40 wt. %, particularly preferably >0 to 25 wt. %, most preferably >0 to 15 wt. % (in each case based on the weight of the reaction mixture).

In a preferred embodiment, the activated DMC catalyst/suspending agent mixture resulting according to steps (α) and (β) are reacted further with one or more alkylene oxide(s), one or more starter substance(s) and carbon dioxide in the same reactor. In a further preferred embodiment, the activated DMC catalyst/suspending agent mixture resulting according to steps (α) and (β) is reacted further with alkylene oxides, one or more starter substance(s) and carbon dioxide in a different reaction container (for example a stirred tank, tube reactor or loop reactor).

In the reaction procedure in a tube reactor, the activated catalyst/suspending agent mixture resulting according to steps (α) and (β), one or more H-functional starter substance(s), one or more alkylene oxide(s) and carbon dioxide are pumped continuously through a tube. The molar ratios of the reaction partners vary according to the desired polymer. In a preferred embodiment, carbon dioxide is metered in here in its liquid or supercritical form, in order to render possible an optimum miscibility of the components. For better thorough mixing of the reaction partners, mixing elements such as are marketed, for example, by Ehrfeld Mikrotechnik BTS GmbH, or mixer-heat exchanger elements which simultaneously improve the mixing and removal of heat are advantageously installed.

Loop reactors can equally be used for the preparation of polyether carbonate polyols. These include in general reactors with recycling of substances, such as, for example, a jet loop reactor, which can also be operated continuously, or a tube reactor configured in loop form with suitable devices for circulating the reaction mixture or a loop of several tube reactors connected in series. The use of a loop reactor is advantageous in particular because backmixing can be realized here, so that the concentration of free alkylene oxides in the reaction mixture can be kept in the optimum range, preferably in the range of >0 to 40 wt. %, particularly preferably >0 to 25 wt. %, most preferably >0 to 15 wt. % (in each case based on the weight of the reaction mixture).

Preferably, the polyether carbonate polyols are prepared in a continuous process which comprises both a continuous copolymerization and a continuous addition of the one or more H-functional starter substance(s).

The invention therefore also provides a process wherein in step ($\gamma$) one or more H-functional starter substance(s), one or more alkylene oxide(s) and DMC catalyst are metered continuously into the reactor in the presence of carbon dioxide ("copolymerization") and wherein the resulting reaction mixture (comprising the reaction product) is removed continuously from the reactor. Preferably, in this context in step ($\gamma$) the DMC catalyst is added continuously as a suspension in the H-functional starter compound.

For example, for the continuous process for the preparation of the polyether carbonate polyols according to steps ($\alpha$) and ($\beta$) an activated DMC catalyst/suspending agent mixture is prepared, and then, according to step ($\gamma$)

($\gamma$1) in each case a part amount of one or more H-functional starter substance(s), one or more alkylene oxide(s) and carbon dioxide are metered in for initiation of the copolymerization, and ($\gamma$2) during the progress of the copolymerization in each case the remaining amount of DMC catalyst, one or more starter substance(s) and alkylene oxide(s) are metered in continuously in the presence of carbon dioxide, the resulting reaction mixture at the same time being removed continuously from the reactor.

In step ($\gamma$) the DMC catalyst is preferably added as a suspension in the H-functional starter compound, the amount preferably being chosen such that the content of DMC catalyst in the resulting reaction product is 10 to 10,000 ppm, particularly preferably 20 to 5,000 ppm and most preferably 50 to 500 ppm.

Preferably, steps ($\alpha$) and ($\beta$) are carried out in a first reactor, and the resulting reaction mixture is then transferred into a second reactor for the copolymerization according to step ($\gamma$). However, it is also possible for steps ($\alpha$), ($\beta$) and ($\gamma$) to be carried out in one reactor.

It has also been found that the process of the present invention can be used for the preparation of large amounts of the polyether carbonate polyol product, a DMC catalyst activated in a suspending agent according to steps ($\alpha$) and ($\beta$) initially being used and the DMC catalyst being added during the copolymerization ($\gamma$) without prior activation.

A particularly advantageous feature of the preferred embodiment of the present invention is thus the ability to use "fresh" DMC catalyst without activation for the part amount of DMC catalyst which is added continuously in step ($\gamma$). An activation of DMC catalysts to be carried out analogously to step ($\beta$) not only includes additional attention by the operating person, as a result of which the production costs increase, it also requires a pressure reaction tank, as a result of which the capital costs during construction of an appropriate production unit also increase. "Fresh" catalyst is defined here as non-activated DMC catalyst in solid form or in the form of a slurry in a starter substance or suspending agent. The ability of the present process to use fresh, non-activated DMC catalyst in step ($\gamma$) renders possible significant savings in the commercial preparation of polyether carbonate polyols and is a preferred embodiment of the present invention.

The term "continuous" used here can be defined as the mode of addition of a relevant catalyst or reactant such that an essentially continuous active concentration of the DMC catalyst or of the reactant is maintained. The addition of the catalyst can be carried out truly continuously or in relatively narrowly spaced increments. Equally, a continuous addition of the starter can be carried out truly continuously or in increments. It would not be a deviation from the present process to add a DMC catalyst or reactant in increments such that the concentration of the materials added drops essentially to zero for some time before the next incremental addition. However, it is preferable for the DMC catalyst concentration to be kept essentially at the same concentration during the majority of the course of the continuous reaction and for the starter substance to be present during the majority of the copolymerization process. An incremental addition of DMC catalyst and/or reactant which does not substantially influence the nature of the product is nevertheless "continuous" in that sense in which the term is used here. It is feasible, for example, to provide a return loop in which a part of the reacting mixture is fed back to a previous point in the process, as a result of which discontinuities effected by incremental additions are smoothed out.

Step ($\delta$)

Optionally, in a step ($\delta$) the reaction mixture removed continuously in step ($\gamma$), which in general comprises a content of from 0.05 wt. % to 10 wt. % of alkylene oxide, can be transferred into an after-reactor in which the content of free alkylene oxide is reduced in the reaction mixture to less than 0.05 wt. % by the route of an after-reaction. A tube reactor, a loop reactor or a stirred tank, for example, can serve as the after-reactor.

Preferably, the pressure in this after-reactor is at the same pressure as in the reaction apparatus in which reaction step ($\gamma$) is carried out. However, the pressure chosen in the downstream reactor can also be higher or lower. In a further preferred embodiment, after reaction step ($\gamma$) all or some of the carbon dioxide is let down and the downstream reactor is operated under normal pressure or a slight increased pressure. The temperature in the downstream reactor is preferably 50 to 150° C., and particularly preferably 80 to 140° C.

The polyether carbonate polyols obtained according to the invention have, for example, a functionality of at least 1, preferably of from 1 to 8, particularly preferably from 1 to 6 and very particularly preferably from 2 to 4. The molecular weight is preferably 400 to 10,000 g/mol and particularly preferably 500 to 6,000 g/mol.

Generally, alkylene oxides (epoxides) having 2-24 carbon atoms can be employed for the process according to the invention. The alkylene oxides having 2-24 carbon atoms are, for example, one or more compounds chosen from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, mono- or poly-epoxidized fats as mono-, di- and triglycerides, epoxidized fatty acids, $C_1$-$C_{24}$ esters of epoxidized fatty acids, epichlorohydrin, glycidol, and derivatives of glycidol, such as, for example, methyl glycidyl ether, ethyl glycidyl ether, 2-ethylhexyl glycidyl ether, allyl glycidyl ether, glycidyl methacrylate and epoxide-functional alkyloxysilanes, such as, for example, 3-glycidyloxypropyltrimethoxysilane, 3-glycidyloxypropyltriethoxysilane, 3-glycidyloxypropyl-tripropoxysilane, 3-glycidyloxypropylmethyldimethoxysilane, 3-glycidyloxypropylethyldiethoxysilane and 3-glycidyloxypropyltriisopropoxysilane. Preferably, ethylene oxide and/or propylene oxide, in particular propylene oxide, are employed as alkylene oxides.

Compounds which can be employed as a suitable H-functional starter substance ("starter") are those having H atoms which are active for the alkoxylation and have a molecular weight of from 18 to 4,500 g/mol, preferably from 62 to 500 g/mol and particularly preferably from 62 to 182 g/mol. The ability to use a starter having a low molecular weight is a significant advantage compared with the use of oligomeric starters which are prepared by means of a prior oxyalkylation. In particular, a profitability is achieved which is rendered possible by the omission of a separate oxyalkylation process.

Groups which have active H atoms and are active for the alkoxylation are, for example, —OH, —NH$_2$ (primary amines), —NH— (secondary amines), —SH, and —CO$_2$H, and —OH and —NH$_2$ are preferred, and —OH is particularly preferred. The H-functional starter substance employed is, for example, one or more compounds chosen from the group consisting of mono- or polyfunctional alcohols, polyfunctional amines, polyfunctional thiols, amino alcohols, thioalcohols, hydroxy esters, polyether polyols, polyester polyols, polyester ether polyols, polyether carbonate polyols, polycarbonate polyols, polycarbonates, polyethyleneimines, polyether-amines, polytetrahydrofurans, (e.g. PolyTHF® from BASF), polytetrahydrofuranamines, polyether thiols, polyacrylate polyols, castor oil, the mono- or diglyceride of ricinoleic acid, monoglycerides of fatty acids, and chemically modified mono-, di- and/or triglycerides of fatty acids and $C_1$-$C_{24}$-alkyl fatty acid esters which comprise on average at least 2 OH groups per molecule. By way of example, the $C_1$-$C_{24}$-alkyl fatty acid esters which contain on average at least 2 OH groups per molecule are commercial products such as Lupranol Balance® (BASF AG), Merginol® types (Hobum Oleochemicals GmbH), Sovermol® types (Cognis Deutschland GmbH & Co. KG) and Soyol®TM types (USSC Co.).

Monofunctional starter substances which can be employed are alcohols, amines, thiols and carboxylic acids. Monofunctional alcohols which can be used are: methanol, ethanol, 1-propanol, 2-propanol, 1-butanol, 2-butanol, tert-butanol, 3-buten-1-ol, 3-butyn-1-ol, 2-methyl-3-buten-2-ol, 2-methyl-3-butyn-2-ol, propargyl alcohol, 2-methyl-2-propanol, 1-tert-butoxy-2-propanol, 1-pentanol, 2-pentanol, 3-pentanol, 1-hexanol, 2-hexanol, 3-hexanol, 1-heptanol, 2-heptanol, 3-heptanol, 1-octanol, 2-octanol, 3-octanol, 4-octanol, phenol, 2-hydroxybiphenyl, 3-hydroxybiphenyl, 4-hydroxybiphenyl, 2-hydroxypyridine, 3-hydroxypyridine, 4-hydroxypyridine. Possible monofunctional amines are: butylamine, tert-butylamine, pentylamine, hexylamine, aniline, aziridine, pyrrolidine, piperidine, morpholine. Monofunctional thiols which can be used are: ethanethiol, 1-propanethiol, 2-propanethiol, 1-butanethiol, 3-methyl-1-butanethiol, 2-butene-1-thiol, thiophenol. Monofunctional carboxylic acids which may be mentioned are: formic acid, acetic acid, propionic acid, butyric acid, fatty acids, such as stearic acid, palmitic acid, oleic acid, linoleic acid, linolenic acid, benzoic acid, acrylic acid.

Polyfunctional alcohols which are suitable as H-functional starter substances are, for example, difunctional alcohols (such as, for example, ethylene glycol, diethylene glycol, propylene glycol, dipropylene glycol, 1,3-propanediol, 1,4-butanediol, 1,4-butenediol, 1,4-butynediol, neopentyl glycol, 1,5-pentanediol, methylpentanediols (such as, for example, 3-methyl-1,5-pentanediol), 1,6-hexanediol, 1,8-octanediol, 1,10-decanediol, 1,12-dodecanediol, bis-(hydroxymethyl)-cyclohexanes (such as, for example, 1,4-bis-(hydroxymethyl)cyclohexane), triethylene glycol, tetraethylene glycol, polyethylene glycols, dipropylene glycol, tripropylene glycol, polypropylene glycols, dibutylene glycol and polybutylene glycols); trifunctional alcohols (such as, for example, trimethylolpropane, glycerol, trishydroxyethyl isocyanurate, castor oil); tetrafunctional alcohols (such as, for example, pentaerythritol); polyalcohols (such as, for example, sorbitol, hexitol, sucrose, starch, starch hydrolysates, cellulose, cellulose hydrolysates, hydroxy-functionalized fats and oils, in particular castor oil), and all modification products of these abovementioned alcohols with various amounts of ε-caprolactone.

The H-functional starter substances can also be chosen from the substance class of polyether polyols which have a molecular weight $M_n$ in the range of from 18 to 4,500 g/mol and a functionality of from 2 to 3. Polyether polyols which are built up from recurring ethylene oxide and propylene oxide units are preferred, preferably having a content of from 35 to 100% of propylene oxide units, particularly preferably having a content of from 50 to 100% of propylene oxide units. These can be random copolymers, gradient copolymers or alternating or block copolymers of ethylene oxide and propylene oxide.

The H-functional starter substances can also be chosen from the substance class of polyester polyols. At least difunctional polyesters are employed as polyester polyols. Polyester polyols preferably comprise alternating acid and alcohol units. Acid components which are employed are e.g. succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride or mixtures of the acids and/or anhydrides mentioned. Alcohol components which are used are e.g. ethanediol, 1,2-propanediol, 1,3-propanediol, 1,4-butanediol, 1,5-pentanediol, neopentyl glycol, 1,6-hexanediol, 1,4-bis-(hydroxymethyl)-cyclohexane, diethylene glycol, dipropylene glycol, trimethylolpropane, glycerol, pentaerythritol or mixtures of the alcohols mentioned. If difunctional or polyfunctional polyether polyols are employed as the alcohol component, polyester ether polyols, which can likewise serve as starter substances for the preparation of the polyether carbonate polyols, are obtained.

Polycarbonate diols which are prepared, for example, by reaction of phosgene, dimethyl carbonate, diethyl carbonate or diphenyl carbonate and difunctional alcohols or polyester polyols or polyether polyols can furthermore be employed as H-functional starter substances. Examples of polycarbonates are to be found e.g. in EP-A 1359177.

In a further embodiment of the invention, polyether carbonate polyols can be employed as H-functional starter substances. In particular, polyether carbonate polyols which are obtainable by the process according to the invention described here are employed. These polyether carbonate polyols employed as H-functional starter substances are prepared beforehand for this in a separate reaction step.

The H-functional starter substances in general have a functionality (i.e. number of H atoms per molecule which are active for the polymerization) of from 1 to 8, preferably of 2 or 3. The H-functional starter substances are employed either individually or as a mixture of at least two H-functional starter substances.

The H-functional starter substances are particularly preferably one or more compounds chosen from the group consisting of ethylene glycol, propylene glycol, 1,3-propanediol, 1,3-butanediol, 1,4-butanediol, 1,5-pentanediol, 2-methylpropane-1,3-diol, neopentyl glycol, 1,6-hexanediol, 1,8-octanediol, diethylene glycol, dipropylene glycol, glycerol, trimethylolpropane, pentaerythritol, sorbitol and polyether polyols having a molecular weight Mn in the range of from 150 to 4,500 g/mol and a functionality of from 2 to 3.

The preparation of the polyether carbonate polyols is carried out by catalytic addition of carbon dioxide and alkylene oxides on to H-functional starter substances. In the context of the invention, "H-functional" is understood as meaning the number of H atoms per molecule of the starter substance which are active for the alkoxylation.

DMC catalysts for use in the homopolymerization of alkylene oxides are known in principle from the prior art (see e.g. U.S. Pat. No. 3,404,109, U.S. Pat. No. 3,829,505, U.S. Pat. No. 3,941,849 and U.S. Pat. No. 5,158,922). DMC catalysts, which are described e.g. in U.S. Pat. No. 5,470,813, EP-A 700 949, EP-A 743 093, EP-A 761 708, WO 97/40086, WO 98/16310 and WO 00/47649, have a very high activity and render possible the preparation of polyether carbonate polyols at very low catalyst concentrations, so that in general it is no longer necessary to separate off the catalyst from the finished product. The highly active DMC catalysts described in EP-A 700 949, which, in addition to a double metal cyanide compound (e.g. zinc hexacyanocobaltate(III)) and an organic complexing ligand (e.g. tert-butanol), also contain a polyether having a number-average molecular weight of greater than 500 g/mol, are a typical example.

The DMC catalysts according to the invention are preferably obtained by a procedure in which
(i) in the first step an aqueous solution of a metal salt is reacted with the aqueous solution of a metal cyanide salt in the presence of one or more organic complexing ligands, e.g. of an ether or alcohol,
(ii) wherein in the second step the solid is separated off by known techniques (such as centrifugation or filtration) from the suspension obtained from (i),
(iii) wherein, if appropriate, in a third step the solid which has been isolated is washed with an aqueous solution of an organic complexing ligand (e.g. by resuspension and subsequent renewed isolation by filtration or centrifugation),
(iv) wherein the solid obtained, if appropriate after pulverization, is subsequently dried at temperatures of in general 20-120° C. and under pressures of from in general 0.1 mbar to normal pressure (1013 mbar), and wherein in the first step or immediately after the precipitation of the double metal cyanide compound (second step) one or more organic complexing ligands, preferably in excess (based on the double metal cyanide compound), and optionally further complexing components are added.

The double metal cyanide compounds contained in the DMC catalysts according to the invention are the reaction products of water-soluble metal salts and water-soluble metal cyanide salts.

For example, an aqueous solution of zinc chloride (preferably in excess, based on the metal cyanide salt, such as, for example, potassium hexacyanocobaltate) and potassium hexacyanocobaltate are mixed and dimethoxyethane (glyme) or tert-butanol (preferably in excess, based on zinc hexacyanocobaltate) is then added to the suspension formed.

Metal salts which are suitable for the preparation of the double metal cyanide compounds preferably have the general formula (II)

$$M(X)_n \qquad (II)$$

wherein
M is chosen from the metal cations $Zn^{2+}$, $Fe^{2+}$, $Ni^{2+}$, $Mn^{2+}$, $Co^{2+}$, $Sr^{2+}$, $Sn^{2+}$, $Pb^{2+}$ and $Cu^{2+}$, preferably M is $Zn^{2+}$, $Fe^{2+}$, $Co^{2+}$ or $Ni^{2+}$,
X are one or more (i.e. different) anions, preferably an anion chosen from the group of halides (i.e. fluoride, chloride, bromide, iodide), hydroxide, sulfate, carbonate, cyanate, thiocyanate, isocyanate, isothiocyanate, carboxylate, oxalate and nitrate;
n is 1 if X=sulfate, carbonate or oxalate and
n is 2 if X=halide, hydroxide, carboxylate, cyanate, thiocyanate, isocyanate, isothiocyanate or nitrate,
or suitable metal salts have the general formula (III)

$$M_r(X)_3 \qquad (III)$$

wherein
M is chosen from the metal cations $Fe^{3+}$, $Al^{3+}$, $Co^{3+}$ and $Cr^{3+}$,
X are one or more (i.e. different) anions, preferably an anion chosen from the group of halides (i.e. fluoride, chloride, bromide, iodide), hydroxide, sulfate, carbonate, cyanate, thiocyanate, isocyanate, isothiocyanate, carboxylate, oxalate and nitrate;
r is 2 if X=sulfate, carbonate or oxalate and
r is 1 if X=halide, hydroxide, carboxylate, cyanate, thiocyanate, isocyanate, isothiocyanate or nitrate,
or suitable metal salts have the general formula (IV)

$$M(X)_s \qquad (IV)$$

wherein
M is chosen from the metal cations $Mo^{4+}$, $V^{4+}$ and $W^{4+}$
X are one or more (i.e. different) anions, preferably an anion chosen from the group of halides (i.e. fluoride, chloride, bromide, iodide), hydroxide, sulfate, carbonate, cyanate, thiocyanate, isocyanate, isothiocyanate, carboxylate, oxalate and nitrate;
s is 2 if X=sulfate, carbonate or oxalate and
s is 4 if X=halide, hydroxide, carboxylate, cyanate, thiocyanate, isocyanate, isothiocyanate or nitrate,
or suitable metal salts have the general formula (V)

$$M(X)_t \qquad (V)$$

wherein
M is chosen from the metal cations $Mo^{6+}$ and $W^{6+}$
X are one or more (i.e. different) anions, preferably an anion chosen from the group of halides (i.e. fluoride, chloride, bromide, iodide), hydroxide, sulfate, carbonate, cyanate, thiocyanate, isocyanate, isothiocyanate, carboxylate, oxalate and nitrate;

t is 3 if X=sulfate, carbonate or oxalate and t is 6 if X=halide, hydroxide, carboxylate, cyanate, thiocyanate, isocyanate, isothiocyanate or nitrate.

Examples of suitable metal salts are zinc chloride, zinc bromide, zinc iodide, zinc acetate, zinc acetylacetonate, zinc benzoate, zinc nitrate, iron(II) sulfate, iron(II) bromide, iron(II) chloride, iron(III) chloride, cobalt(II) chloride, cobalt(II) thiocyanate, nickel(II) chloride and nickel(II) nitrate. Mixtures of various metal salts can also be employed.

Metal cyanide salts which are suitable for the preparation of the double metal cyanide compounds preferably have the general formula (VI)

$(Y)_a M'(CN)_b (A)_c$        (VI)

wherein

M' is chosen from one or more metal cations of the group consisting of Fe(II), Fe(III), Co(II), Co(III), Cr(II), Cr(III), Mn(II), Mn(III), Ir(III), Ni(II), Rh(III), Ru(II), V(IV) and V(V), preferably M' is one or more metal cations of the group consisting of Co(II), Co(III), Fe(II), Fe(III), Cr(III), Ir(III) and Ni(II), Y is chosen from one or more metal cations of the group consisting of alkali metal (i.e. $Li^+$, $Na^+$, $K^+$, $Rb^+$) and alkaline earth metal (i.e. $Be^{2+}$, $Mg^{2+}$, $Ca^{2+}$, $Sr^{2+}$, $Ba^{2+}$), A is chosen from one or more anions of the group consisting of halides (i.e. fluoride, chloride, bromide, iodide), hydroxide, sulfate, carbonate, cyanate, thiocyanate, isocyanate, isothiocyanate, carboxylate, azide, oxalate or nitrate and a, b and c are integers, wherein the values for a, b and c are chosen such that the metal cyanide salt has electroneutrality; a is preferably 1, 2, 3 or 4; b is preferably 4, 5 or 6; c preferably has the value 0.

Examples of suitable metal cyanide salts are sodium hexacyanocobaltate(III), potassium hexacyanocobaltate (III), potassium hexacyanoferrate(II), potassium hexacyanoferrate(II), calcium hexacyanocobaltate(III) and lithium hexacyanocobaltate(III).

Preferred double metal cyanide compounds which the DMC catalysts according to the invention comprise are compounds of the general formula (VII)

$M_x[M'_{x'}(CN)_y]_z$        (VII)

wherein M is as defined in formula (II) to (V) and

M' is as defined in formula (VI), and x, x', y and z are integers and are chosen such that the double metal cyanide compound has electroneutrality.

Preferably x=3, x'=1, y=6 and z=2,

M=Zn(II), Fe(II), Co(II) or Ni(II) and

M'=Co(III), Fe(III), Cr(III) or Ir(III).

Examples of suitable double metal cyanide compounds a) are zinc hexacyanocobaltate(III), zinc hexacyanoiridate(III), zinc hexacyanoferrate(III) and cobalt(II) hexacyanocobaltate(III). Further examples of suitable double metal cyanide compounds are to be found e.g. in U.S. Pat. No. 5,158,922 (column 8, lines 29-66). Zinc hexacyanocobaltate(III) is particularly preferably used.

The organic complexing ligands added in the preparation of the DMC catalysts are disclosed, for example, in U.S. Pat. No. 5,158,922 (see in particular column 6, lines 9 to 65), U.S. Pat. No. 3,404,109, U.S. Pat. No. 3,829,505, U.S. Pat. No. 3,941,849, EP-A 700 949, EP-A 761 708, JP 4 145 123, U.S. Pat. No. 5,470,813, EP-A 743 093 and WO-A 97/40086). For example, water-soluble, organic compounds having hetero atoms, such as oxygen, nitrogen, phosphorus or sulfur, which can form complexes with the double metal cyanide compound are employed as organic complexing ligands. Preferred organic complexing ligands are alcohols, aldehydes, ketones, ethers, esters, amides, ureas, nitriles, sulfides and mixtures thereof. Particularly preferred organic complexing ligands are aliphatic ethers (such as dimethoxyethane), water-soluble aliphatic alcohols (such as ethanol, isopropanol, n-butanol, iso-butanol, sec-butanol, tert-butanol, 2-methyl-3-buten-2-ol and 2-methyl-3-butyn-2-ol) and compounds which comprise both aliphatic or cycloaliphatic ether groups and aliphatic hydroxyl groups (such as e.g. ethylene glycol mono-tert-butyl ether, diethylene glycol mono-tert-butyl ether, tripropylene glycol monomethyl ether and 3-methyl-3-oxetane-methanol). Organic complexing ligands which are most preferred are chosen from one or more compounds of the group consisting of dimethoxyethane, tert-butanol, 2-methyl-3-buten-2-ol, 2-methyl-3-butyn-2-ol, ethylene glycol mono-tert-butyl ether and 3-methyl-3-oxetane-methanol.

One ore more complexing component(s) from the compound classes of polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylic acid-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkyleneimines, maleic acid and maleic anhydride copolymers, hydroxyethylcellulose and polyacetals, or of glycidyl ethers, glycosides, carboxylic acid esters of polyfunctional alcohols, bile acids or salts, esters or amides thereof, cyclodextrins, phosphorus compounds, α,β-unsaturated carboxylic acid esters or ionic surface- or interface-active compounds are optionally employed in the preparation of the DMC catalysts according to the invention.

Preferably, in the first step in the preparation of the DMC catalysts according to the invention the aqueous solutions of the metal salt (e.g. zinc chloride), employed in stoichiometric excess (at least 50 mol %) based on the metal cyanide salt (that is to say at least a molar ratio of metal salt to metal cyanide salt of 2.25 to 1.00) and of the metal cyanide salt (e.g. potassium hexacyanocobaltate) are reacted in the presence of the organic complexing ligand (e.g. tert-butanol), a suspension which comprises the double metal cyanide compound (e.g. zinc hexacyanocobaltate), water, excess metal salt and the organic complexing ligand being formed.

In this context, the organic complexing ligand can be present in the aqueous solution of the metal salt and/or of the metal cyanide salt, or it is added directly to the suspension obtained after precipitation of the double metal cyanide compound. It has proved to be advantageous to mix the aqueous solutions of the metal salt and of the metal cyanide salt and the organic complexing ligand with vigorous stirring. The suspension formed in the first step is then optionally treated with a further complexing component. In this context, the complexing component is preferably employed in a mixture with water and organic complexing ligand. A preferred process for carrying out the first step (i.e. the preparation of the suspension) is carried out employing a mixing nozzle, particularly preferably employing a jet disperser as described in WO-A 01/39883.

In the second step the solid (i.e. the precursor of the catalyst according to the invention) is isolated from the suspension by known techniques, such as centrifugation or filtration.

In a preferred embodiment variant, in a third process step the solid which has been isolated is subsequently washed with an aqueous solution of the organic complexing ligand (e.g. by resuspension and subsequent renewed isolation by filtration or centrifugation). In this manner, for example, water-soluble by-products, such as potassium chloride, can be removed from the catalyst according to the invention. Preferably, the amount of organic complexing ligand in the aqueous wash solution is between 40 and 80 wt. %, based on the total solution.

In the third step, further complexing component is optionally added to the aqueous wash solution, preferably in the range of between 0.5 and 5 wt. %, based on the total solution.

It is moreover advantageous for the solid which has been isolated to be washed more than once. Preferably, washing is carried out in a first washing step (iii-1) with an aqueous solution of the unsaturated alcohol (e.g. by resuspension and subsequent renewed isolation by filtration or centrifugation), in order to remove, for example, water-soluble by-products, such as potassium chloride, from the catalyst according to the invention in this manner. Particularly preferably, the amount of unsaturated alcohol in the aqueous wash solution is between 40 and 80 wt. %, based on the total solution of the first washing step. In the further washing steps (iii-2), either the first washing step is repeated once or several times, preferably once to three times, or, preferably, a non-aqueous solution, such as e.g. a mixture or solution of unsaturated alcohol and further complexing component (preferably in the range of between 0.5 and 5 wt. %, based on the total amount of the wash solution of step (iii-2)), is employed as the wash solution and the solid is washed with this once or several times, preferably once to three times.

The solid which has been isolated and optionally washed is then dried, optionally after pulverization, at temperatures of in general 20-100° C. and under pressures of from in general 0.1 mbar to normal pressure (1013 mbar).

A preferred method for isolating the DMC catalysts according to the invention from the suspension by filtration, washing of the filter cake and drying is described in WO-A 01/80994.

The polyether carbonate polyols obtainable by the process according to the invention have a low content of by-products and can be processed without problems, in particular by reaction with di- and/or polyisocyanates to give polyurethanes, in particular flexible polyurethane foams. For polyurethane uses, polyether carbonate polyols which are based on an H-functional starter substance which has a functionality of at least 2 are preferably employed. The polyether carbonate polyols obtainable by the process according to the invention can furthermore be used in uses such as detergent and cleaning agent formulations, drilling liquids, fuel additives, ionic and nonionic surfactants, lubricants, process chemicals for papermaking or textile production or cosmetic formulations. It is known to the person skilled in the art that, depending on the particular field of use, the polyether carbonate polyols to be used must comply with certain substance properties, such as, for example, molecular weight, viscosity, functionality and/or hydroxyl number.

EXAMPLES

Starting Substances

PET-1: trifunctional poly(oxypropylene) polyol having an OH number of 237 mg of KOH/g.

The DMC catalyst employed in all the examples was the DMC catalyst prepared according to Example 6 in WO 01/80994 A1.

The OH number (hydroxyl number) was determined in accordance with DIN 53240-2.

The number-average molecular weight $M_n$ and the weight-average molecular weight $M_w$ and the polydispersity index ($M_w/M_n$) of the products were determined by means of gel permeation chromatography (GPC). The procedure was in accordance with DIN 55672-1: "Gel permeation chromatography, Part 1—Tetrahydrofuran as the eluting agent" (SECurity GPC System from PSS Polymer Service, flow rate 1.0 ml/min; columns: 2×PSS SDV linear M, 8×300 mm, 5 μm; RID detector). Polystyrene samples of known molecular weight were used here for the calibration.

The determination of the viscosity was carried out on a Physica MCR 501 rheometer from Anton Paar. A ball-plate configuration with a separation of 1 mm was chosen (DCP25 measuring system). The polyether carbonate polyol (0.1 g) was applied to the rheometer plate and subjected to a shear rate of 0.01 to 1,000 l/s at 25° C. and the viscosity was measured every 10 s for 10 min. The viscosity averaged over all the measurement points is stated.

The content of incorporated $CO_2$ in the resulting polyether carbonate polyol and the ratio of propylene carbonate to polyether carbonate polyol were determined by means of $^1$H-NMR (Bruker, DPX 400, 400 MHz; pulse program zg30, waiting time d1: 10 s, 64 scans). The sample was dissolved in deuterated chloroform in each case. The relevant resonances in the $^1$H-NMR (based on TMS=0 ppm) are as follows:
cyclic carbonate (which was formed as a by-product) resonance at 4.5 ppm, carbonate, resulting from carbon dioxide incorporated in the polyether carbonate polyol (resonances at 5.1 to 4.8 ppm), unreacted PO with resonance at 2.4 ppm, polyether polyol (i.e. without incorporated carbon dioxide) with resonances at 1.2 to 1.0 ppm.

The molar content of the carbonate incorporated in the polymer in the reaction mixture is calculated according to formula (VIII) as follows, the following abbreviations being used:

A(4.5)=area of the resonance at 4.5 ppm for cyclic carbonate (corresponds to an H atom)

A(5.1–4.8)=area of the resonance at 5.1–4.8 ppm for polyether carbonate polyol and an H atom for cyclic carbonate.

A(2.4)=area of the resonance at 2.4 ppm for free, unreacted PO

A(1.2–1.0)=area of the resonance at 1.2–1.0 ppm for polyether polyol

Taking into account the relative intensities, the polymer-bonded carbonate ("linear carbonate" LC) in the reaction mixture was converted into mol % according to the following formula (VIII)

$$LC = \frac{A(5.1-4.8) - A(4.5)}{A(5.1-4.8) + A(2.4) + 0.33*A(1.2-1.0)} * 100 \qquad (VIII)$$

The weight content (in wt. %) of polymer-bonded carbonate (LC') in the reaction mixture was calculated according to formula (IX)

$$LC' = \frac{[A(5.1-4.8) - A(4.5)]*102}{N} * 100\% \qquad (IX)$$

the value for N ("denominator" N) being calculated according to formula (X):

$$N = [A(5.1-4.8)-A(4.5)]*102 + A(4.5)*102 + A(2.4)*58 + 0.33*A(1.2-1.0)*58 \quad (X)$$

The factor 102 results from the sum of the molecular weights of $CO_2$ (molecular weight 44 g/mol) and that of propylene oxide (molecular weight 58 g/mol), the factor 58 results from the molecular weight of propylene oxide.

The weight content (in wt. %) of cyclic carbonate (CC') in the reaction mixture was calculated according to formula (XI), $$CC' = \frac{A(4.5)*102}{N} *100\% \quad (XI)$$

the value for N being calculated according to formula (X).

In order to calculate from the values of the composition of the reaction mixture the composition based on the polymer content (comprising polyether, which was built up from propylene oxide during the activation steps which took place under $CO_2$-free conditions, and polyether carbonate polyol, built up from the starter, propylene oxide and carbon dioxide during the activation steps which took place in the presence of $CO_2$ and during the copolymerization), the non-polymer constituents of the reaction mixture (i.e. cyclic propylene carbonate and any unreacted propylene oxide present) were eliminated by calculation. The weight content of the carbonate recurring units in the polyether carbonate polyol was converted into a weight content of carbon dioxide by means of the factor $F=44/(44+58)$. The $CO_2$ content in the polyether carbonate polyol ("incorporated $CO_2$"; see the following examples and Table 1) stated is standardized to the polyether carbonate polyol molecule which is formed during the copolymerization and the activation steps.

The amount of cyclic propylene carbonate formed is determined via the relationship between the total amount of cyclic propylene carbonate present in the reaction mixture and the amount of propylene carbonate initially introduced. The total amount of cyclic propylene carbonate results from the quantitative removal of the cyclic propylene carbonate from the reaction mixture by means of thin film evaporation (0.1 mbar, 120° C.). The amount of propylene carbonate formed is then determined via back-calculation with the amount of propylene carbonate initially introduced.

Example 1

Preparation of Polyether Carbonate Polyol with cPC Initially Introduced as the Suspending Agent and Continuous Metering of Glycerol as the H-Functional Starter Substance Step α:

134 mg of dried DMC catalyst, which is not activated, were suspended in 97.04 g of 4-methyl-2-oxo-1,3-dioxolane (hereinafter also called cyclic propylene carbonate or cPC) and the suspension was then introduced into a 1 l pressure reactor with a gas metering device. The suspension was then heated up to 130° C., and nitrogen was passed in at 26-30 l/h for 30 min and at the same time a reduced pressure of 75-100 mbar was applied.

Step β:

An amount of 10 g of propylene oxide (PO) was then added to the reactor all at once at 130° C. and 1,250 rpm and under a prepressure of 100 mbar, which was established with nitrogen. The start-up of the reaction manifested itself by a temperature peak ("hot spot") and by a drop in pressure to the starting pressure. After the first drop in pressure, the reactor was charged with p1=49 bar of $CO_2$ and a further 10 g of PO were then added all at once for the activation. After a waiting time, a temperature peak occurred again and the overall pressure in the reaction showed a decrease in pressure.

Step γ:

After the activation had taken place, propylene oxide (514 g) at approx. 2.2 g/min and 18 g of the low molecular weight starter glycerol (to which 90 ppm of 85% strength $H_3PO_4$ were added) at 0.1 g/min were metered simultaneously into the reactor. At the same time the reaction temperature was lowered from 130° C. in steps of 5° C. per five minutes to 105° C. The progress of the reaction was observed by the $CO_2$ consumption, the pressure in the reactor being kept constant at the pressure p1 stated above by continuous regulated topping up. When the addition of PO had ended, the mixture was subsequently stirred (1,250 rpm) at 105° C. under the reaction pressure until the $CO_2$ consumption dwindled. The cyclic propylene carbonate was separated off from the reaction mixture by means of thin film evaporation (0.1 mbar, 120° C.). The $CO_2$ content incorporated in the polyether carbonate polyol, the ratio of cyclic to linear carbonate, the polydispersity index (PDI) and the OH number are stated in Table 1.

Example 2

Preparation of Polyether Carbonate Polyol with cPC Initially Introduced as the Suspending Agent and Continuous Metering of Glycerol as the H-Functional Starter Substance In accordance with Example 1, the preparation of the polyether carbonate polyol was carried out, 30.38 g of cPC being employed as the suspending agent in step α and a pressure p1 of 44 bar being established. The results are stated in Table 1.

Example 3

Preparation of Polyether Carbonate Polyol with cPC Initially Introduced as the Suspending Agent and Continuous Metering of Glycerol as the H-Functional Starter Substance In accordance with Example 1, the preparation of the polyether carbonate polyol was carried out, 75.9 g of cPC being employed as the suspending agent in step α and a pressure p1 of 46 bar being established. The results are stated in Table 1.

Example 4

Preparation of Polyether Carbonate Polyol with Toluene Initially Introduced as the Suspending Agent and Continuous Metering of Glycerol as the H-Functional Starter Substance In accordance with Example 1, the preparation of the polyether carbonate polyol was carried out, 30.2 g of toluene being employed as the suspending agent in step α and a pressure p1 of 48 bar being established. In this context, in deviation from Example 1 step α was carried out as follows:

134 mg of dried DMC catalyst, which is not activated, were suspended in 30.2 g of toluene and the suspension was then introduced into a 1 l pressure reactor with a gas metering device, the suspension was then heated up to 130° C. and the reactor was charged three times with 5 bar (absolute) of nitrogen and the increased pressure then reduced to approx. 1 bar (absolute) each time. The results are stated in Table 1.

Example 5 (Comparative)

Preparation of Polyether Carbonate Polyol with Polyether Carbonate Polyol Initially Introduced as the Suspending Agent and Continuous Metering of Glycerol as the H-Functional Starter Substance In accordance with Example 1, the preparation of the polyether carbonate polyol was carried out, 30.3 g of polyether carbonate polyol which was prepared beforehand according to Example 1 being initially introduced as the suspending agent for the DMC catalyst. The results are stated in Table 1.

Example 6 (Comparative)

Preparation of Polyether Carbonate Polyol with Polyether Polyol Initially Introduced as the Suspending Agent and Continuous Metering of Glycerol as the H-Functional Starter Substance In accordance with Example 1, the preparation of the polyether carbonate polyol was carried out, in step α 54.32 g of polyether polyol PET-1 being employed instead of a suspending agent. In this context, in deviation from Example 1 step α was carried out as follows:

159 mg of dried DMC catalyst, which is not activated, were suspended in 54.32 g of PET-1 and the suspension was then introduced into a 1 l pressure reactor with a gas metering device, the suspension was then heated up to 130° C. and the reactor was charged three times with 5 bar (absolute) of nitrogen and the increased pressure then reduced to approx. 1 bar (absolute) each time.

In deviation from Example 1, step γ was carried out as follows:

After the activation had taken place, 95 g of PO were added with the metering rate of 1.8 g/min. 567 g of PO with a metering rate of 2.7 g/min and 20 g of the low molecular weight starter glycerol (to which 90 ppm of 85% strength $H_3PO_4$ were added) with a metering rate of 0.1 g/min were metered simultaneously into the reactor and the further procedure was as stated in Example 1. The results are stated in Table 1.

It can be seen from Table 1 that during the preparation of polyether carbonate polyols with cPC initially introduced as the suspending agent in the context of the present invention, significantly better selectivities are obtained with a simultaneously high incorporation of $CO_2$ of more than 15 wt. %. Moreover, the polydispersity index is reduced significantly when cPC is employed as the suspending agent.

TABLE 1

Results of the polyether carbonate polyol preparation

| Example | Suspending agent initially introduced | Cyclic/ linear carbonate | $CO_2$ incorporation [wt. %] | PDI [$M_w$/ $M_n$] | OH number [mg of KOH/g] |
|---|---|---|---|---|---|
| 1 | cPC | 0.08 | 17.47 | 1.10 | 53.2 |
| 2 | cPC | 0.04 | 15.93 | 1.12 | 54.3 |
| 3 | cPC | 0.05 | 16.85 | 1.11 | 52.5 |
| 4 | toluene | 0.14 | 18.03 | 1.46 | 53.3 |
| 5* | product, from Example 1 | 0.15 | 18.42 | 1.21 | 54.7 |
| 6* | PET-1 | 0.16 | 15.91 | 1.29 | 54.0 |

*= comparative example

Examples for the Continuous Preparation of Polyether Carbonate Polyols

The following examples (Examples 7, 8) for the continuous preparation of polyether carbonate polyols were carried out in a cascade of three pressure reactors connected in series (reactor R1 (300 ml volume), reactor R2 (300 ml volume) and reactor R3 (1,700 ml volume)).

To record the propylene oxide concentration in reactor R2, a Bruker MATRIX-MF spectrometer equipped with 3.17 mm ATR-IR fibre optic probes was used. The ATR-IR fibre optic probes (90° diamond prism of 1×2 mm base area and 1 mm height as the ATR element, 2×45° reflection of the IR beam, IR beam coupled via light-conducting fibre) were installed in the reactor such that the diamond at the end of the 3.17 mm ATR fibre optic probe was immersed completely in the reaction mixture. IR spectra (mean of 100 scans) were recorded every 60 seconds in the range of 4000-650 $cm^{-1}$ with a resolution of 4 $cm^{-1}$. The propylene oxide concentration was monitored via recording of the characteristic band for propylene oxide at 830 $cm^{-1}$. A decrease in the intensity of the band at 830 $cm^{-1}$ to 5% of the maximum value was evaluated as complete conversion of propylene oxide.

Example 7

Continuous Preparation of Polyether Carbonate Polyol with Glycerol as the H-Functional Starter Substance Preparation of a Suspension from DMC Catalyst and Glycerol A mixture of DMC catalyst (1.21 g) and glycerol (171.41 g) was initially introduced into a 300 ml pressure reactor (reactor R1) equipped with an impeller stirrer. The reactor was closed and the dispersion of DMC catalyst and glycerol in reactor R1 was stirred at 100 rpm at room temperature (25° C.) overnight. The pressure in reactor R1 was adjusted to 60 bar with argon, which is passed into the gas phase, and kept at 60 bar by topping up during the following steps.

Step α:

A mixture of DMC catalyst (0.0291 g) and cyclic propylene carbonate (100.18 g) was initially introduced into a 300 ml pressure reactor (reactor R2) equipped with an impeller stirrer and baffle plate. Reactor R2 was closed, the pressure in reactor R2 was reduced to 50 mbar and the reactor was heated up to 130° C. A gentle stream of Ar into the reaction mixture at the base of the reactor was then established. By regulating the gentle stream of Ar and simultaneously removing the gas with a pump, the pressure in reactor R2 was adjusted to 50 mbar, and the mixture was stirred (500 rpm) at 130° C. under reduced pressure (50 mbar) and a gentle stream of Ar for 30 min.

Step β:

10 g of propylene oxide were metered into reactor R2 with the aid of a flow regulator (200 g/h). The decrease in the concentration of the propylene oxide was monitored via IR spectroscopy. The reaction mixture was stirred (500 rpm) until conversion of the propylene oxide was complete (approx. 5 min). 10 g of propylene oxide were subsequently metered into reactor R2 a further time with the aid of the HPLC pump (200 g/h) and the reaction mixture was stirred (500 rpm) until conversion of the propylene oxide was complete (approx. 5 min). A briefly increased evolution of heat in reactor R2 was observed after addition of the propylene oxide.

Step γ:

The temperature of the mixture in reactor R2 was then lowered to 105° C. 68 g/h of propylene oxide were metered continuously into reactor R2 via a flow regulator. At the same time the suspension of DMC catalyst and glycerol from reactor R1 was passed continuously into reactor R2 at a rate of 2.9 g/h. Furthermore, $CO_2$ was passed continuously into the gas phase of reactor R2 at a flow rate of 30 g/h and the pressure was increased slowly (at 0.4 bar $min^{-1}$) to 50 bar. As soon as the overflow from reactor R2 (at a liquid volume of 175 ml) was reached, a valve was opened at the outlet of reactor R2 and the outlet stream was removed via a further pressure tank (reactor R3, equipped with a spiral stirrer) and a prepressure regulator. The pressure in reactors 2 and 3 was regulated at 50 bar via the prepressure regulator. The product mixture was collected under pressure in reactor R3 at 105° C. and stirred at 300 rpm. After an operating time of 17 hours the liquid phase was drained off from reactor R3 via a valve. After a further operating time of 28.5 hours the reaction product obtained was removed via the valve of reactor 3 and, before analysis, purified from readily volatile constituents. For this, the reaction mixture was diluted with methylene chloride (20 ml) and the solution was passed through a falling film evaporator. The solution (0.1 kg in 1 h) ran down along the inner wall of a tube of 70 mm diameter and 200 mm length heated externally at 120° C., the reaction mixture being distributed in each case uniformly as a thin film on the inner wall of the falling film evaporator by three rolls of 10 mm diameter rotating at a speed of 250 rpm. Inside the tube, a pressure of <1 mbar was established via a pump. The reaction mixture which had been purified from readily volatile constituents (unreacted epoxides, cyclic carbonate, solvent) was collected in a receiver at the lower end of the heated tube.

Characterization of the product from reactor 3 after the falling film evaporator:

Ratio of cyclic/linear carbonate: 0.08
Weight content of carbon dioxide in the polyether carbonate polyol: 20.21 wt. %.
Molecular weight $M_n$=2,908 g/mol, $M_w$=3,675 g/mol, polydispersity index=126.
OH number=60.5 mg of KOH/g.
Viscosity (25° C.)=36.0 Pa s.

Example 8

Continuous Preparation of Polyether Carbonate Polyol with Dipropylene Glycol as the H-Functional Starter Substance Preparation of a Suspension from DMC Catalyst and Dipropylene Glycol:

A mixture of DMC catalyst (0.5972 g) and dipropylene glycol (200.10 g) was initially introduced into a 300 ml pressure reactor (reactor R1) equipped with an impeller stirrer. The reactor was closed and the dispersion of DMC catalyst and dipropylene glycol in reactor R1 was stirred at 100 rpm at room temperature (25° C.) overnight. The pressure in reactor R1 was adjusted to 60 bar with argon, which is passed into the gas phase, and kept at 60 bar by topping up during the following steps.

Step α:

A mixture of DMC catalyst (0.0252 g) and cyclic propylene carbonate (99.98 g) was initially introduced into a 300 ml pressure reactor (reactor R2) equipped with an impeller stirrer and baffle plate. Reactor R2 was closed, the pressure in reactor R2 was reduced to 50 mbar and reactor R2 was heated to 130° C. A gentle stream of Ar into the reaction mixture at the base of the reactor was then established. By regulating the gentle stream of Ar and simultaneously removing the gas with a pump, the pressure in the reactor was adjusted to 50 mbar, and the mixture was stirred (500 rpm) at 130° C. under reduced pressure (50 mbar) and a gentle stream of Ar for 30 min.

Step β:

10 g of propylene oxide were metered into reactor R2 with the aid of a flow regulator (200 g/h). The decrease in the concentration of the propylene oxide was monitored via IR spectroscopy. The reaction mixture was stirred (500 rpm) until conversion of the propylene oxide was complete (approx. 5 min). 10 g of propylene oxide were subsequently metered into reactor R2 a further time with the aid of the HPLC pump (200 g/h) and the reaction mixture was stirred (500 rpm) until conversion of the propylene oxide was complete (approx. 5 min). A briefly increased evolution of heat in reactor R2 was observed after addition of the propylene oxide.

Step γ:

The temperature of the mixture in reactor R2 was then lowered to 105° C. 70 g/h of propylene oxide were metered continuously into reactor R2 via a flow regulator. At the same time the suspension of DMC catalyst and dipropylene glycol from reactor R1 was passed continuously into reactor R2 at a rate of 6.0 g/h. Furthermore, $CO_2$ was passed continuously into the gas phase of reactor R2 at a flow rate of 30 g/h and the pressure was increased slowly (at 0.4 bar $min^{-1}$) to 50 bar. As soon as the overflow from reactor R2 (at a liquid volume of 175 ml) was reached, a valve was opened at the outlet of reactor R2 and the outlet stream was removed via a further pressure tank (reactor R3, equipped with a spiral stirrer) and a prepressure regulator. The pressure in reactors 2 and 3 was regulated at 50 bar via the prepressure regulator. The product mixture was collected under pressure in reactor R3 at 105° C. and stirred at 300 rpm. After an operating time of 18 hours the liquid phase was drained off from reactor R3 via a valve. After a further operating time of 30.5 hours the reaction product obtained was removed via the valve of reactor 3 and, before analysis, purified from readily volatile constituents. For this, the reaction mixture was diluted with methylene chloride (20 ml) and the solution was passed through a falling film evaporator. The solution (0.1 kg in 1 h) ran down along the inner wall of a tube of 70 mm diameter and 200 mm length heated externally at 120° C., the reaction mixture being distributed in each case uniformly as a thin film on the inner wall of the falling film evaporator by three rolls of 10 mm diameter rotating at a speed of 250 rpm. Inside the tube, a pressure of <1 mbar was established via a pump. The reaction mixture which had been purified from readily volatile constituents (unreacted epoxides, cyclic carbonate, solvent) was collected in a receiver at the lower end of the heated tube.

Characterization of the Product from Reactor 3 after the Falling Film Evaporator:
Ratio of cyclic/linear carbonate: 0.16
Weight content of carbon dioxide in the polyether carbonate polyol: 17.30 wt. %.
Molecular weight $M_n$=2,846 g/mol, $M_w$=3,288 g/mol, polydispersity index=1.16.
OH number=60.4 mg of KOH/g.
Viscosity (25° C.)=4.1 Pa s.

The invention claimed is:

1. A process for the preparation of polyether carbonate polyols by addition of alkylene oxides and carbon dioxide on to one or more H-functional starter substance(s) in the presence of a double metal cyanide catalyst (DMC), comprising:
   (α) initially introducing a suspending agent which comprises no H-functional groups into a reactor and
   (γ) metering into the reactor one or more H-functional starter substance(s), one or more alkylene oxide(s) and optionally carbon dioxide simultaneously or sequentially, wherein said one or more H-functional starter substance(s) are metered continuously into the reactor during the reaction.

2. The process according to claim 1, wherein in step (α) a suspending agent which comprises no H-functional groups is initially introduced into the reactor and no H-functional starter substance is initially introduced into the reactor.

3. The process according to claim 1, wherein in step (α) a suspending agent which comprises no H-functional groups and additionally a part of the H-functional starter substance(s) are initially introduced into the reactor.

4. The process according to claim 1, wherein in step (α) a suspending agent which comprises no H-functional groups together with DMC catalyst are initially introduced into the reactor.

5. The process according to claim 1, additionally comprising after step (α):
   (β) adding a part amount of alkylene oxide to the mixture from step (α): at temperatures of from 90 to 150° C., in which case the addition of the alkylene oxide compound is then interrupted.

6. The process according to claim 5, wherein step (β) is carried out under an inert gas atmosphere, under an atmosphere of an inert gas/carbon dioxide mixture or under a carbon dioxide atmosphere.

7. The process according to claim 5, wherein step (β) comprises:
   (β1) in a first activation stage the addition of a first part of alkylene oxide is carried out under an inert gas atmosphere and
   (β2) in a second activation stage the addition of a second part of alkylene oxide is carried out under a carbon dioxide atmosphere.

8. The process according to claim 1, wherein in step (γ) one or more H-functional starter substance(s) and one or more alkylene oxide(s) are metered continuously in the presence of carbon dioxide.

9. The process according to claim 1, wherein in step (γ) the metering of the one or more H-functional starter substance(s) is ended completed at a time before the addition of the alkylene oxide.

10. The process according to claim 8, wherein in step (γ) DMC catalyst is metered continuously into the reactor and the resulting reaction mixture is removed continuously from the reactor.

11. The process according to claim 10, wherein the DMC catalyst is added continuously as a suspension in the H-functional starter compound.

12. The process according to claim 10, comprising:
   (δ) transferring the reaction mixture removed continuously in step (γ) having a content of from 0.05 wt. % to 10 wt. % of alkylene oxide into an after-reactor in which the content of free alkylene oxide is reduced in the reaction mixture to less than 0.05 wt. % by an after-reaction.

13. The process according to claim 1, wherein in step (α) at least one compound selected from the group consisting of 4-methyl-2-oxo-1,3-dioxolane, 1,3-dioxolan-2-one, acetone, methyl ethyl ketone, acetonitrile, nitromethane, dimethylsulfoxide, sulfolane, dimethylformamide, dimethylacetamide, N-methylpyrrolidone, dioxane, diethyl ether, methyl tert-butyl ether, tetrahydrofuran, ethyl acetate, butyl acetate, pentane, n-hexane, benzene, toluene, xylene, ethylbenzene, chloroform, chlorobenzene, dichlorobenzene and carbon tetrachloride is employed as the suspending agent.

14. The process according to claim 1, wherein in step (α) 4-methyl-2-oxo-1,3-dioxolane and 1,3-dioxolan-2-one or a mixture of 4-methyl-2-oxo-1,3-dioxolane and 1,3-dioxolan-2-one is employed as the suspending agent.

15. The process according to claim 1, wherein the H-functional starter substance is at least one substance selected from the group consisting of ethylene glycol, propylene glycol, 1,3-propanediol, 1,3-butanediol, 1,4-butanediol, 1,5-pentanediol, 2-methylpropane-1,3-diol, neopentyl glycol, 1,6-hexanediol, 1,8-octanediol, diethylene glycol, dipropylene glycol, glycerol, trimethylolpropane, pentaerythritol, sorbitol and polyether polyols having a molecular weight Mn in the range of from 150 to 4,500 g/mol and a functionality of from 2 to 3.

* * * * *